(12) United States Patent
De Pauw et al.

(10) Patent No.: US 8,754,892 B2
(45) Date of Patent: *Jun. 17, 2014

(54) VISUALIZATION OF VIRTUAL IMAGE RELATIONSHIPS AND ATTRIBUTES

(75) Inventors: Wim De Pauw, Scarborough, NY (US); Herbert M. Lee, New Fairfield, CT (US); Peter K. Malkin, Ardsley, NY (US)

(73) Assignee: International Business Machines Corporation, Armonk, NY (US)

( * ) Notice: Subject to any disclaimer, the term of this patent is extended or adjusted under 35 U.S.C. 154(b) by 110 days.

This patent is subject to a terminal disclaimer.

(21) Appl. No.: 13/284,270

(22) Filed: Oct. 28, 2011

(65) Prior Publication Data

US 2013/0106860 A1 May 2, 2013

(51) Int. Cl.
*G06T 11/20* (2006.01)
*G06T 11/00* (2006.01)
*G06T 1/00* (2006.01)

(52) U.S. Cl.
CPC ............. *G06T 11/206* (2013.01); *G06T 11/001* (2013.01); *G06T 11/20* (2013.01); *G06T 1/00* (2013.01)
USPC ........... 345/440; 345/672; 345/420; 345/629; 235/494

(58) Field of Classification Search
CPC ..... G06T 11/206; G06T 11/001; G06T 11/20; G06T 1/00; A63F 13/12
USPC ............................ 345/672, 420, 629; 235/494
See application file for complete search history.

(56) References Cited

U.S. PATENT DOCUMENTS

| | | | | |
|---|---|---|---|---|
| 5,313,571 A | * | 5/1994 | Hirose et al. | 345/440 |
| 5,581,797 A | * | 12/1996 | Baker et al. | 715/708 |
| 5,856,828 A | | 1/1999 | Letcher, Jr. | |
| 6,222,559 B1 | * | 4/2001 | Asano et al. | 345/440 |
| 6,323,863 B1 | * | 11/2001 | Shinagawa et al. | 345/441 |
| 6,373,484 B1 | * | 4/2002 | Orell et al. | 345/420 |
| 6,417,850 B1 | | 7/2002 | Kang | |
| 6,538,651 B1 | * | 3/2003 | Hayman et al. | 345/419 |
| 7,253,823 B2 | * | 8/2007 | Wong et al. | 345/629 |

(Continued)

FOREIGN PATENT DOCUMENTS

JP 2009087161 4/2009

OTHER PUBLICATIONS

Silva, et al., "Provenance-Enabled Exploration and Visualization with VisTrails," 2010 Proceedings of 23rd SIBGRAP1 Conference on Graphics, Patterns and Images Tutorials (SIBGRAP1-T 2010), pp. 1-9.

(Continued)

*Primary Examiner* — Javid A Amini
(74) *Attorney, Agent, or Firm* — Thomas Grzesik; Fleit Gibbons Gutman Bongini & Bianco PL

(57) ABSTRACT

A method, system, and computer program product graphically display attributes associated with virtual images. A set of attributes associated with each virtual image in a plurality of virtual images is analyzed. At least one graph including a plurality of nodes is generated. Each node in the plurality of nodes represents one virtual image in the plurality of virtual images. Each node is graphically displayed with at least one visual indicator. The at least one visual indicator represents at least one attribute in the set of attributes associated with the virtual image represented by the node.

16 Claims, 10 Drawing Sheets

(56) References Cited

U.S. PATENT DOCUMENTS

| | | | |
|---|---|---|---|
| 7,463,263 B2* | 12/2008 | Gilboa | 345/440 |
| 7,812,838 B1* | 10/2010 | Ian | 345/440 |
| 7,983,239 B1* | 7/2011 | Weinstein et al. | 370/351 |
| 8,271,259 B2 | 9/2012 | Berkowitz et al. | |
| 8,321,126 B2* | 11/2012 | Mays | 701/428 |
| 8,407,605 B2 | 3/2013 | Go et al. | |
| 2001/0010518 A1* | 8/2001 | Saitou | 345/433 |
| 2002/0163889 A1* | 11/2002 | Yemini et al. | 370/238 |
| 2003/0214503 A1* | 11/2003 | Venkataraman et al. | 345/420 |
| 2004/0032410 A1* | 2/2004 | Ryan | 345/427 |
| 2005/0001841 A1 | 1/2005 | Francois et al. | |
| 2006/0033741 A1 | 2/2006 | Royz et al. | |
| 2006/0181528 A1* | 8/2006 | Lee et al. | 345/419 |
| 2007/0013697 A1* | 1/2007 | Gilboa | 345/440 |
| 2007/0280165 A1* | 12/2007 | Doshi et al. | 370/331 |
| 2008/0092043 A1 | 4/2008 | Trethewey | |
| 2009/0100096 A1* | 4/2009 | Erlichson et al. | 707/104.1 |
| 2009/0132309 A1* | 5/2009 | Marin | 705/7 |
| 2009/0327985 A1* | 12/2009 | Chen et al. | 716/6 |
| 2010/0007665 A1 | 1/2010 | Smith et al. | |
| 2010/0013838 A1 | 1/2010 | Ito | |
| 2010/0114629 A1* | 5/2010 | Adler et al. | 705/7 |
| 2010/0188402 A1* | 7/2010 | Mejdrich et al. | 345/426 |
| 2010/0231723 A1* | 9/2010 | Nam et al. | 348/169 |
| 2011/0055714 A1* | 3/2011 | Vemulapalli et al. | 715/739 |
| 2012/0116953 A1* | 5/2012 | Marin | 705/38 |
| 2012/0167086 A1* | 6/2012 | Lee | 718/1 |
| 2012/0229635 A1 | 9/2012 | Royz et al. | |
| 2013/0080482 A1* | 3/2013 | Berkowitz et al. | 707/803 |

OTHER PUBLICATIONS

Non-Final Office Action dated Apr. 16, 2013 for U.S. Appl. No. 13/614,944.

* cited by examiner

| IMAGE ID | USER | PLATFORM | IMAGE TITLE | DETAILS | IMAGE SIZE (GB) |
|---|---|---|---|---|---|
| Image_0 | User_A | X86_xen | OSI_Base_Image_small | OSI Base Image {CPU = 1, MEM=1G, DISK =18GB} | 1 |
| Image_1 | User_A | X86_xen | OSI_Base_Image_large | OSI Base Image {CPU=4, MEM=6GB, DISK =72GB} | 1 |
| Image_2 | User_B | X86_xen | eBusiness App with OSI | eBusiness App built on OSI_Base_Image_small {CPU=1, MEM =1GB, DISK= 20GB} | 11 |
| ... | ... | ... | ... | ... | ... |
| Image_21 | USER_B | X86_xen | AR Test with OSI | New version of OSI_Base_Image_small {CPU=1, MEM=1GB, DISK= 18GB} | 11 |
| ... | ... | ... | ... | ... | ... |
| Image_200 | User_TG | X86_xen | eBusiness App with OSI and AI | eBusiness App with AI built on OSI_Base_Image_small {CPU=1, MEM=1GB, DISK= 30GB} | 8 |
| Image_201 | User_LM | X86_xen | Database Pre install with OSI | DB with encrypted data built on OSI_Base_Image_large {CPU=4, MEM=6GB, DISK= 90GB} | 9 |
| ... | ... | ... | ... | ... | ... |

FIG. 2

| CHILD IMAGE | PARENT IMAGE | CONTENT CHANGE | ... |
|---|---|---|---|
| IMAGE_2 | IMAGE_0 | 1.10 | ... |
| IMAGE_3 | IMAGE_140 | 1.01 | ... |
| IMAGE_4 | IMAGE_140 | 1.01 | ... |
| IMAGE_5 | IMAGE_0 | 1.20 | ... |
| IMAGE_6 | IMAGE_146 | 1.50 | ... |
| IMAGE_7 | IMAGE_0 | 1.07 | ... |
| ... | ... | ... | ... |
| IMAGE_21 | IMAGE_0 | 3.02 | ... |
| IMAGE_22 | IMAGE_0 | 1.60 | ... |
| IMAGE_23 | IMAGE_1 | 2.50 | ... |
| IMAGE_24 | IMAGE_1 | 2.40 | ... |
| ... | ... | ... | ... |
| IMAGE_200 | IMAGE_2 | 7.0 | ... |
| IMAGE_201 | IMAGE_200 | 6.50 | ... |
| ... | ... | ... | ... |

VISUALIZATION OF VIRTUAL IMAGE RELATIONSHIPS AND ATTRIBUTES

BACKGROUND

The present invention generally relates to computing system virtualization technologies, and more particularly relates to visualizing virtual image relationships and attributes.

Virtualization technologies are becoming increasingly popular. Such virtualization technologies enable a user to seamlessly partition resources of a single physical machine into multiple virtual machines (VMs), which utilize various assets such as virtual images. Conventional tools allow users to easily create/build the virtual images. This can lead to thousands of virtual images being stored in a repository. This large number of images can be problematic for maintenance purposed. For example, conventional virtual image maintenance tools are generally text based, which makes managing these large numbers of virtual images very labor intensive.

BRIEF SUMMARY

In one embodiment, a method for graphically displaying attributes associated with virtual images is disclosed. The method comprises analyzing a set of attributes associated with each virtual image in a plurality of virtual images. At least one graph comprising a plurality of nodes is generated. Each node in the plurality of nodes represents one virtual image in the plurality of virtual images. Each node is graphically displayed with at least one visual indicator. The at least one visual indicator represents at least one attribute in the set of attributes associated with the virtual image represented by the node.

In another embodiment, a system for graphically displaying attributes associated with virtual images is disclosed. The system comprises a memory and a processor communicatively coupled with the memory. A virtual image visualization manager is communicatively coupled to the memory and the processor. The virtual image visualization manager is configured to perform a method comprising analyzing a set of attributes associated with each virtual image in a plurality of virtual images. At least one graph comprising a plurality of nodes is generated. Each node in the plurality of nodes represents one virtual image in the plurality of virtual images. Each node is graphically displayed with at least one visual indicator. The at least one visual indicator represents at least one attribute in the set of attributes associated with the virtual image represented by the node.

In yet another embodiment, a computer program product tangibly embodying computer readable non-transitory instructions is disclosed. The computer readable non-transitory instructions, when implemented, cause a computer to carry out the steps of a method for graphically displaying attributes associated with virtual images. The method comprises analyzing a set of attributes associated with each virtual image in a plurality of virtual images. At least one graph comprising a plurality of nodes is generated. Each node in the plurality of nodes represents one virtual image in the plurality of virtual images. Each node is graphically displayed with at least one visual indicator. The at least one visual indicator represents at least one attribute in the set of attributes associated with the virtual image represented by the node.

In a further embodiment, a tangible computer readable storage medium having stored thereon a data structure comprising a graph for displaying attributes associated with virtual images is disclosed. The graph comprises a root node representing a base virtual image. At least one child node is coupled to at least one parent node by a connector. The least one child node represents a virtual image that is associated with a virtual image represented by the at least one parent node. At least one of the child node and the parent node comprises at least one visual indicator representing at least one attribute associated with the virtual image represented by the at least one of the at least one of the child node and the parent node.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 2 is a table illustrating one example of information/attributes that can be associated with a virtual image according to one embodiment of the present invention;

DETAILED DESCRIPTION

As discussed above, virtual image repositories can comprise a large number of images. These images require storage space and maintenance in terms of updating software and mitigating security risks. However, conventional virtual image management tools are usually text based. If a repository includes thousands of virtual images using a text based management tool can be very labor intensive. Understanding the provenance relationships, ownerships, and contents of thousands of images can also be a very time consuming and error prone task when using these conventional management tools.

Therefore, as will be discussed in greater detail below, one or more embodiments of the present invention graphically display the virtual images within a repository. For example, various embodiments utilize different visual indicators to represent virtual image attributes such as relationships/provenance, resource requirements, user/author, popularity, and the like. This allows a user such as an administrator to easily see a current state of the repository and the attributes associated with the virtual images residing therein.

Operating Environment

Figure 1:
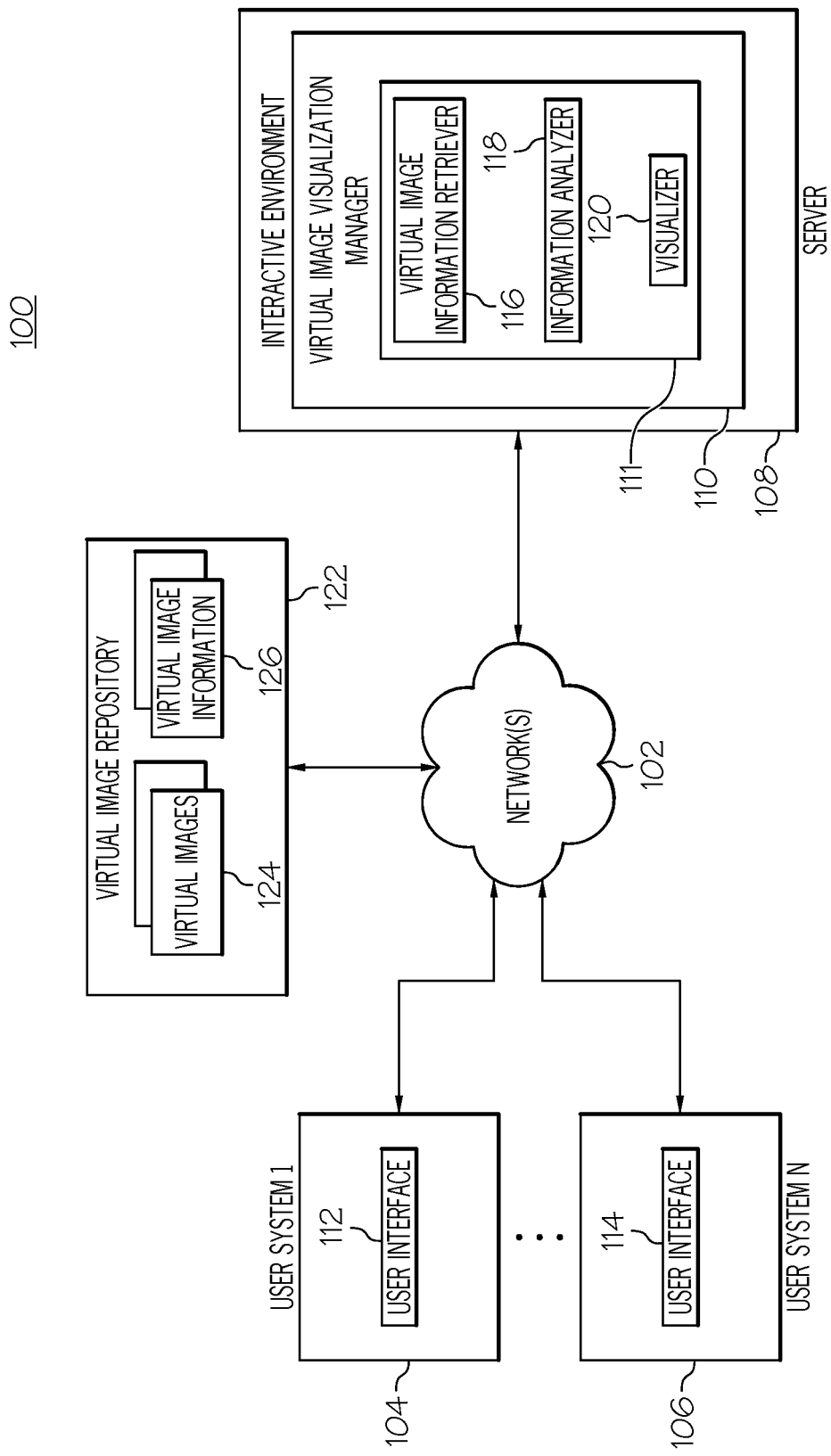
FIG. 1 is a block diagram illustrating one example of an operating environment according to one embodiment of the present invention.

The operating environment of FIG. 1 can be a cloud computing environment or a non-cloud computing environment. FIG. 1 shows one or more networks 102 that, in one embodiment, can include wide area networks, local area networks, wireless networks, and/or the like. In one embodiment, the environment 100 includes a plurality of information processing systems 104, 106, 108 that are communicatively coupled to the network(s) 102. The information processing systems 104, 106, 108 include one or more user systems 104, 106 and one or more servers 108. The user systems 104, 106 can include, for example, information processing systems such as desktop computers, laptop computers, wireless devices such as mobile phones, personal digital assistants, and the like. The user systems can be associated with an end user, an administrator, or the like.

The server system 108 includes, for example, an interactive environment 110 that comprises a virtual image visualization manager 111 for managing and visualizing the attributes of virtual images. Users of the user systems 104, 106 interact with the interactive environment 110 via a user interface 112, 114 or programmatically via an API (not shown). The virtual image visualization manager 111, in one embodiment, comprises a virtual image information retriever 116, an information analyzer 118, and a visualizer 120. The interactive environment utilizes these components to determine the provenance and relationships of virtual images and graphically display this information to a user via the user interface 112, 114. The interactive environment 110 and its components are discussed in greater detail below.

FIG. 1 also shows that one or more virtual image repositories 122 are communicatively coupled to the server 108 via the network(s) 102. The repository 122 stores virtual images 124 and information 126 associated with the virtual images 124. It should be noted that the virtual images 124 and their corresponding information 126 are not required to be stored in the same system. In one embodiment, the virtual images 124 can be accessed by users of the user systems 104, 106 via the user interfaces 112, 114 and a virtual image build environment (not shown). The virtual image build environment allows the users to create/build virtual images and add them to the repository 122. For example, the users are able to generate base virtual images (i.e., images that are not built using other virtual images) or utilize one or more of the virtual images 124 within the repository 122 to create/build additional virtual images. The build environment, in one embodiment, can also comprise the virtual image repository 122.

The virtual image information 126, in one embodiment, includes virtual image attribute information such as provenance/relationship, resource requirements, user/author information, and the like. For example, the virtual image information 126 identifies whether a virtual image in the repository 122 is a base image or was built using another image such as a base image or a child of a base image. Stated differently, the virtual image information 126 comprises build information that identifies the image(s) used to build a given virtual image and any child/parent relationship between these virtual images. The virtual image information 126 can also include various attributes associated with each virtual image such as, but not limited to, CPU requirements, memory requirements, and disk space requirements. The virtual image information 126 can further include a platform independent image description model that can describes a virtual image's: (1) contents and capabilities; (2) hardware requirements including hypervisor requirements; (3) deployment time configuration steps that are to be executed and their parameters; and (4) capture time cleanup steps that must be executed and their parameters.

It should be noted that even though FIG. 1 shows the virtual images 124 and their corresponding information 126 as being separate, a virtual image can include its virtual image information in addition to any required disk images, scripts, binaries, etc., either directly or by reference, needed to deploy the virtual image. It should also be noted that even though FIG. 1 shows the virtual image repository 122 residing outside of the server 108 this repository 122 can reside within the server 108 and/or in the same location as well.

Visually Representing Provenance Relationships and Other Attributes of Virtual Images In one embodiment, the virtual image information retriever 116 accesses the virtual image repository 122 and retrieves the virtual image information 126. This retrieval process can be initiated by a user at the user the user system 104, 106. For example, the user, via the user interface 112, 114, can instruct the interactive environment 110 to retrieve the virtual image information 126. This instruction can be part of a request to graphically display provenance/relationships and other attributes of virtual images or can be part of a separate request to retrieve information. Stated differently, the interactive environment 110 can retrieve the virtual image information 126 either as part of the visualization process discussed below or as part of an independent information retrieval process.

In another embodiment, the information retriever 116 can be configured to automatically retrieve virtual image information 126 at given intervals. The retrieved virtual image information 126 can then be stored on the server 108. In this embodiment, the visualizer 120 utilizes this previously stored virtual image information 126 to graphically represent virtual image attributes such as provenance/relationships between virtual images, as compared to retrieving the virtual image information 126 on a per request basis. If the visualizer 120 determines that the previously stored virtual image information 126 is stale (e.g., retrieved at a point in time that occurred beyond a given threshold in time, or that occurred beyond a defined event), the visualizer 120 can instruct the virtual image information retriever 116 to retrieve the most current virtual image information. Image information can become stale for a variety of reasons, including but not limited to a) release of new OS and application features b) release of security or defect repair updates c) corporate mandate to eliminate support for an OS or application d) access certificate reissue e) license revocation or extension f) vendor product end-of-life, etc.

Figure 3:
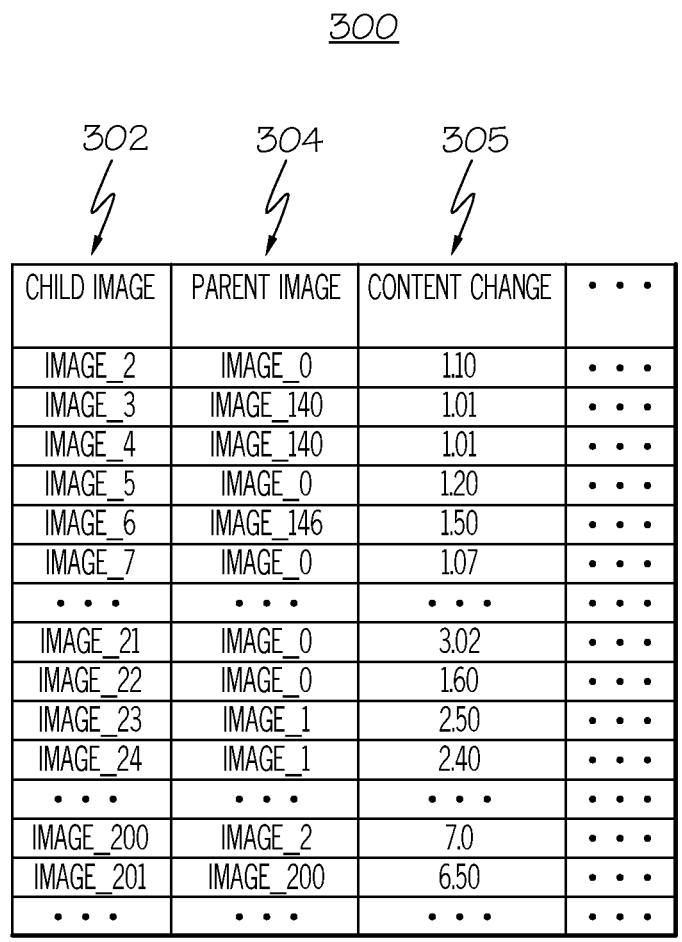
FIG. 3 is another table illustrating another example of information/attributes that can be associated with a virtual image according to one embodiment of the present invention.

FIGS. 2-3 show one example of virtual image information 126 that is retrievable by the virtual image information retriever 116. It should be noted that the information shown in FIGS. 2-3 is only one example of virtual image information. Other embodiments can include additional information as well. FIG. 2 shows a table 200 comprising a plurality of columns and rows, where each row is associated with a given virtual image 124 in the repository 122. A first column 202, entitled "Image ID", comprises entries that uniquely identify a given virtual image. A second column 204, entitled "User", comprises entries that identify the user (e.g., author) who created the virtual image associated with the row. A third column 206, entitled "Platform", includes entries that identify the computing platform associated with the corresponding virtual image. A fourth column 208, entitled "Image Title", includes entries that provide the title of the corresponding virtual image.

A fifth column 210, entitled "Details", comprises entries that describe the corresponding virtual image. These entries can describe attributes of the virtual images such as (but not limited to) relationship information, functions/operations of the virtual image, CPU requirements, memory requirements, disk size requirements, and the like. For example, an entry under this column shows that Image_0 is a base image with operating system OS1 and requires 1 CPU, 1 GB of memory, and 18 GB of disk space. Other examples of information associated with a corresponding virtual image that can be included in the table 200 are contents and capabilities, hardware requirements including hypervisor requirements, deployment time configuration steps that are to be executed and their parameters, capture time cleanup steps that must be executed and their parameters, and disk images, scripts, binaries, etc., either directly or by reference, needed to deploy the virtual image. A sixth column 211, entitled "Image size", comprises entries that describe the size that is needed to store the corresponding virtual image. This image size is different than the size of the memory and the disk space that is needed to deploy this image into a fully working computing unit. This size is of interest to the administrator of the virtual image repository 122, because it impacts the space requirements of the repository 122.

FIG. 3 shows a table 300 comprising additional virtual image information such as virtual image provenance/relationship information as well as content change information. For example, table 300 comprises a first column 302 entitled "Child Image" and a second column 304 entitled "Parent Image". Entries under the first column 302 identify a given child image. A corresponding entry under the second column 304 identifies the parent image of the child image identified in the first column 302. For example, table 300 shows that Image_0 and Image_1 are base images; Image_2 was built using Image_0; Image_21 was built using Image_0; Image_200 was built using Image_2; and Image_201 was built using Image_1.

A third column 305, entitled "Content Change", comprises entries that show how much the content of a child image changed compared to the content of its parent image. A change in content can be calculated in a number of ways. For example, this change can be expressed as the ratio of the number of files that have been added, removed or modified to obtain the child virtual image, to the total number of files in the parent virtual image. Other metrics can be used to express the change in content. For example where the size of the files is taken into account to calculate previously mentioned ratio. This ratio may be provided by the Virtual Image Repository 122 as a convenience function. It should be noted that the information shown in tables 200 and 300 can be included within a single table as well.

Once the above information is retrieved by the virtual information retriever 116, the information analyzer 118 analyzes the virtual image information 126 to identify/determine the attributes associated with each virtual image 124. Stated differently, the information analyzer 118 determines the provenance/relationships of the virtual images, resource requirements, user information, etc. For example, the information analyzer 118 determines that that Image_0 and Image_1 are base/root images; Image_2 is a child of Image_0; Image_21 is a child of Image_0; Image_200 is a child of Image_2; and Image_201 is a child of Image_201.

Figure 4:
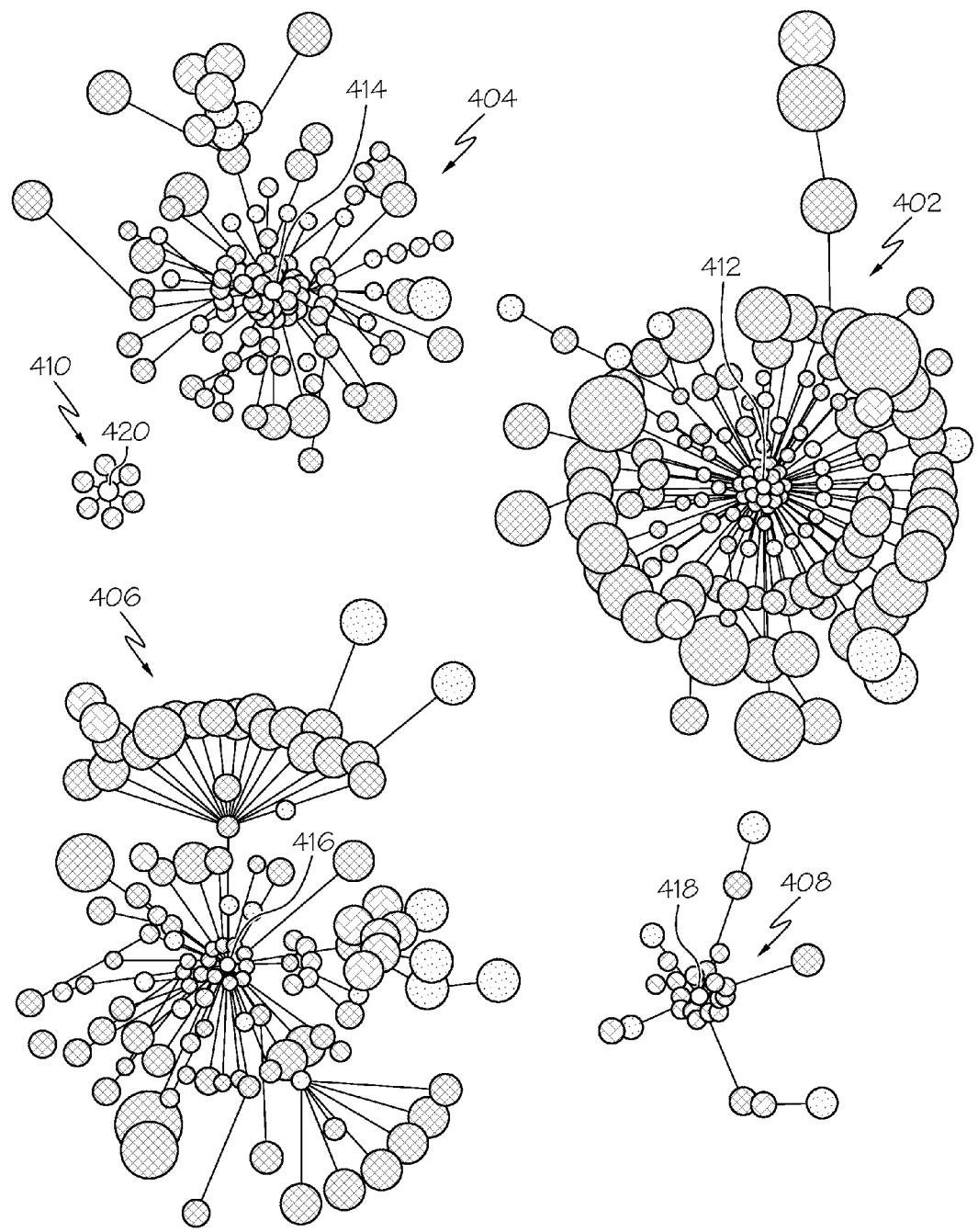
FIG. 4 illustrates various examples of graphs being generated for graphically representing attributes associated with virtual images according to one embodiment of the present invention.

The visualizer 120 then graphically represents each virtual image and its attributes. For example, FIG. 4 shows a plurality of graphs 402, 404, 406, 408, 410 that have been created by the visualizer 120 based on the retrieved virtual image information 126 discussed above. Each graph represents a family of virtual images 124 within the virtual image repository 122. For example, each graph includes a center node 412, 414, 416, 418, 420 that represents a base image. Virtual images built using the base image or using a child image of the base image are shown as nodes connected directly or indirectly to the center node, respectively. A child node represents a virtual image that was built using the virtual image represented by the child's node parent node. Information such as nodes, sizes of the nodes, the edges, and the sizes of the edges can be determined from the virtual image information 126 or can be manually entered by a user.

Figure 5:
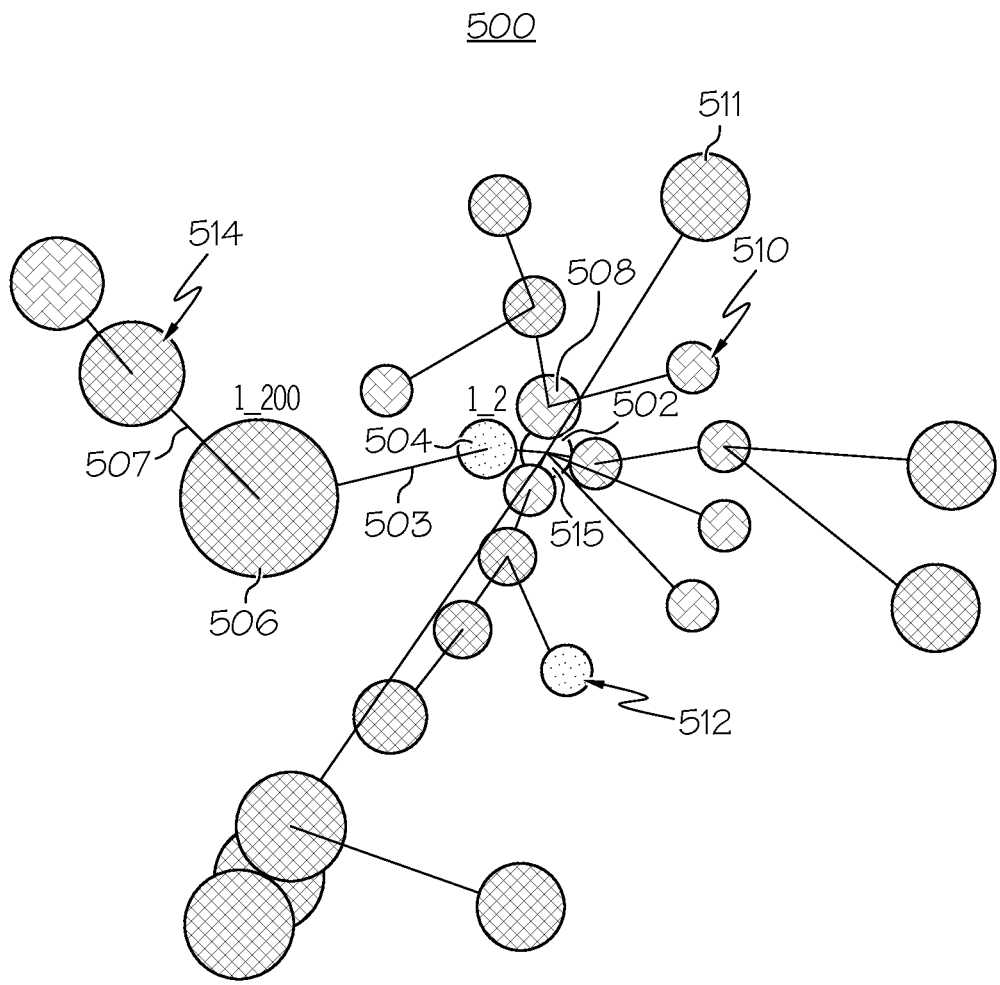
FIG. 5 shows a more simplistic view of a virtual image graph according to one embodiment of the present invention.

As can be seen, a single graph can represent a very large number of virtual images and many graphs can be generated depending on the number of base virtual images in the repository 122. Therefore, a simplified graph, as shown in FIG. 5, will be used to discuss the various aspects of a graph generated using one or more embodiments of the present invention. In particular, FIG. 5 shows a graph 500 generated by the visualizer 120 based on retrieved virtual image information 126. The graph 500 includes a plurality of nodes with a root/center node 502 residing in the center of the graph. As discussed above, this root node 502 represents a base image, such as Image_0 shown in the table 200 of FIG. 2. The base image is the virtual image from which all other virtual images in a graph originate from either directly or indirectly. The provenance/relationship (or ancestry) of the virtual images of one or more nodes on the graph relative to the root node extends radially outward and away from the root node 502. Each node in the graph 500 can be displayed with an identifier that uniquely identifies the virtual image represented by that node. This identifier can be the image identifier taken from table 200 or table 300, an abbreviated version of the image identifier, or the like. For example, FIG. 5 shows that the node 504 representing Image_2 is designated with an "I_2" identifier and the node 506 representing Image_200 is designated with an "I_200" identifier.

A child node is connected to its parent node via a connector shown as a line 503 in FIG. 5. A child node is a virtual image that was built using a virtual image represented by the parent node. For example, a child node 506 representing Image_200 is shown as being directly connected to its parent node 504 representing Image_2. This indicates that Image_200 was built using Image_2, which corresponds to the information shown in table 200 and table 300. FIG. 5 also shows that node 504 is a child of the root/center node 502, which represents Image_0. This indicates that Image_was built using Image_0. In one embodiment, virtual images that have been removed from the repository 122 but are related (i.e., are a child or an ancestor) to other images within the repository 122 can be shown in the graph as well. For example, a node representing a removed image can be visually different (e.g. grayed out) from the other nodes representing virtual images that reside within the repository 122. This preserves the graph representing the provenance of the nodes, since the removed image and its connecting edges remain in place, albeit with less emphasis. Alternatively, the graph can contain only the image ID of the removed virtual image as compared to a node comprising a geometric (or non-geometric) shape.

The visualizer 120 can represent a virtual image and its attributes including the provenance/relationships between virtual images using various visual indicators. These visual indicators are selected/generated based on the virtual image information 126 that has been retrieved/obtained. For example, a base image can be represented as a node having a visual indicator designated for a base image only and is different from any other visual indicator used for child nodes/images. This visual indicator can comprise any one or more of a shape, color, pattern, shading, or the like that is only assigned to a base image.

A child virtual image is represented as node having one or more visual indicators that visually indicate one or more attributes of the child virtual image. One type of visual indicator is the size of the node representing the child virtual image. In this embodiment, the size of the node represents the total virtual image size requirement 211 or more general, resource requirements such as CPU requirements, memory or disk size requirements of the child virtual image. For example, FIG. 5 shows that the area of the circle representing child node 508, which represents Image_21, is substantially/almost the same as its parent node, which is root node 502. This indicates that the image sizes of Image_0 (1 GB) and Image_21 (1.1 GB) are substantially/almost the same. In other words, the size of Image_21, which was built using Image_0, is not substantially greater or less than the size of Image_0. This can be also seen in table 200, which shows that Image_0 and Image_21 have image sizes 1 GB and 1.1 GB, respectively.

If there is a delta (e.g., a change) in image size of a child node and its parent node then the size of the child node can be either larger or smaller than its parent node depending on whether the child image size has increased or decreased with respect to parent image size. For example, FIG. 5 shows that the area of node 506, which represents Image_200, is larger than the area of its parent node 504, which represents Image_2. This indicates that the size of Image_200 has increased compared to the size of Image_2. For example, table 200 shows that the size of Image_2 is 1.1 GB and the size of Image_200 is 8 GB.

In addition to the node size other visual indicators can be used to indicate attributes of virtual images and their relationships. In this embodiment, different geometric (or non-geometric) shapes, colors, patterns, shadings, etc. can be used to visually indicate attributes including relationships between a child virtual image and a parent virtual image. For example, FIG. 5 shows that each node is associated with a different pattern. This type of visual indicator node can indicate the relationship between parent/child nodes or other attributes similar to that discussed above.

For example, a first pattern 510 (shown as a scale pattern in FIG. 5) can indicate that there was only a minimal change of content of a child virtual image compared to the content of its parent virtual image, as given by the Content Change column 305 in table 300. A second pattern 512 (shown as a vertical dashed pattern in FIG. 5) can indicate that the content of a child virtual image differs significantly from the content of its parent virtual image. A third pattern 514 (shown as a crosshatch pattern in FIG. 5) can indicate that a child virtual image has undergone even more significant changes compared to its parent image. Since this metric of change is always relative to a parent image, it is not applicable to a base or root image. Therefore, a base image such as the one shown by 502 will be depicted with a blank pattern 515. Additional patterns or other visual indicators can be used to represent additional ranges/thresholds for indicating an increase or decrease in changes in content or other requirements by a child image. Alternatively, a single pattern can be used to represent any change in content or resource requirements. A single pattern can also be used to represent any decrease in resource requirements as well. In one embodiment, the rate of change can be indicated by color using a bi-chromatic scale, e.g., transitioning from blue (no change) to purple (moderate change) to red (significant change). However, other visual mechanisms, colors, or patterns can be used to show a rate of change as well.

In addition to displaying nodes of the graph in visually different ways to represent the attributes of a virtual image the connectors (e.g., lines) between a node representing a child image and a node representing the child's parent image can be used to indicate some of these attributes as well. In this embodiment, the length of a connector is proportional to the change in content of the child image to the content its parent image. For example, a short connector indicates a there is little (or no) change in content, while a longer connector indicates that the child image differs significantly from its parent image. Different lengths can be used to represent different ranges/thresholds similar to that discussed above. In this example, nodes representing child virtual images with a smaller (or no) change in contents will be displayed closer to its parent node than child nodes representing child virtual images with larger changes contents. For example, FIG. 5 shows that the distance between node 508 and the root/center node 502 is shorter than the distance between node 511 and the root/center node 502. This is because node 508 represents an image that was created based on image (Image_0) 502 and underwent few modifications, whereas the virtual image represented by node 511 underwent significant changes compared to the same base image (Image_0) 502. This results in the connector between node 508 and node 502 being shorted than the connector between node 511 and node 502. It should be noted that a child image that did not undergo any changes in its content can be displayed as touching its parent node without the need for a connector.

Figure 6:
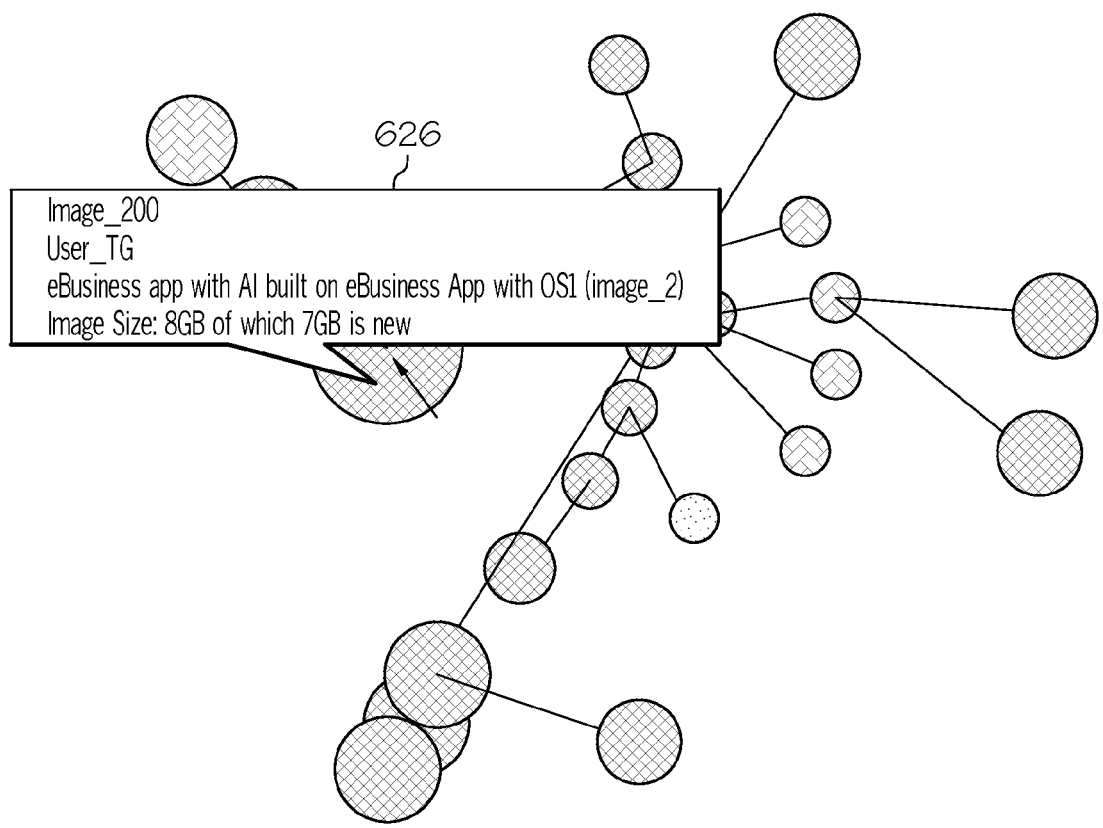
FIG. 6 shows the graph of FIG. 5 displaying virtual image attribute information for a virtual image in response to a user interacting with the node representing that image according to one embodiment of the present invention.

In one embodiment, the user can interact with the graph in various ways. For example, the user can zoom in/out of the graph to see a more granular view of the graph. Also, the above relationship and attribute information can be displayed to a user as the user interacts with the graph as well. For example, FIG. 6 shows that a user has placed his/her cursor over a node 506 in the graph 500 shown in FIG. 5. As the cursor is placed over the node 506 virtual image information 626 associated with the virtual image represented by that node is displayed to the user. The displayed information can include items from the virtual image information 126 retrieved as part of the visualization process or any other information associated with the virtual image. For example, the displayed information can include the image ID, user ID, details details/attributes associated with the image, parent image, image size, the amount of content change with respect to the parent image, etc.

In addition to representing the relationships between a parent and child virtual image, the above visual indicators can also be used to represent other aspects associated with virtual images. For example, a visual indicator (e.g., size, shape, position, color, pattern, etc.) can represent the user/author of a virtual image. The visual indicators can also represent the popularity of virtual image. Popularity can be based on the (recursive) number of images that have been derived from a virtual image either from all users or different users. Popularity can also be measured in terms of the number of deployments for an image. A user is able to configure the visualizer 120 (e.g., adjust various parameters) to generate graphs for displaying the various types of attributes/information discussed above. For example, the user, via the user interface 112, can select which types of visual indicators to use and also select the attributes/information that are to be represented by the selected visual indicators.

The visualizer 120 can also be configured to show the changes, such as growth and removed/deleted images, in the repository 120 over a given period of time or sequence of time intervals. Animation can be used to reflect the evolution of the image repository 122 over time. In yet another embodiment, the user can configure the visualizer 120 to use visual indicators to show other attributes of an image such as software contents, security vulnerabilities, upgrades needed, conflicts, etc. The visual indicators discussed above can also be used to provide various alerts to a user such as when a given threshold has been exceeded. This embodiment is also useful for comparing two visualizations, each representing different snapshots in time, different image repositories, etc.

Figure 7:
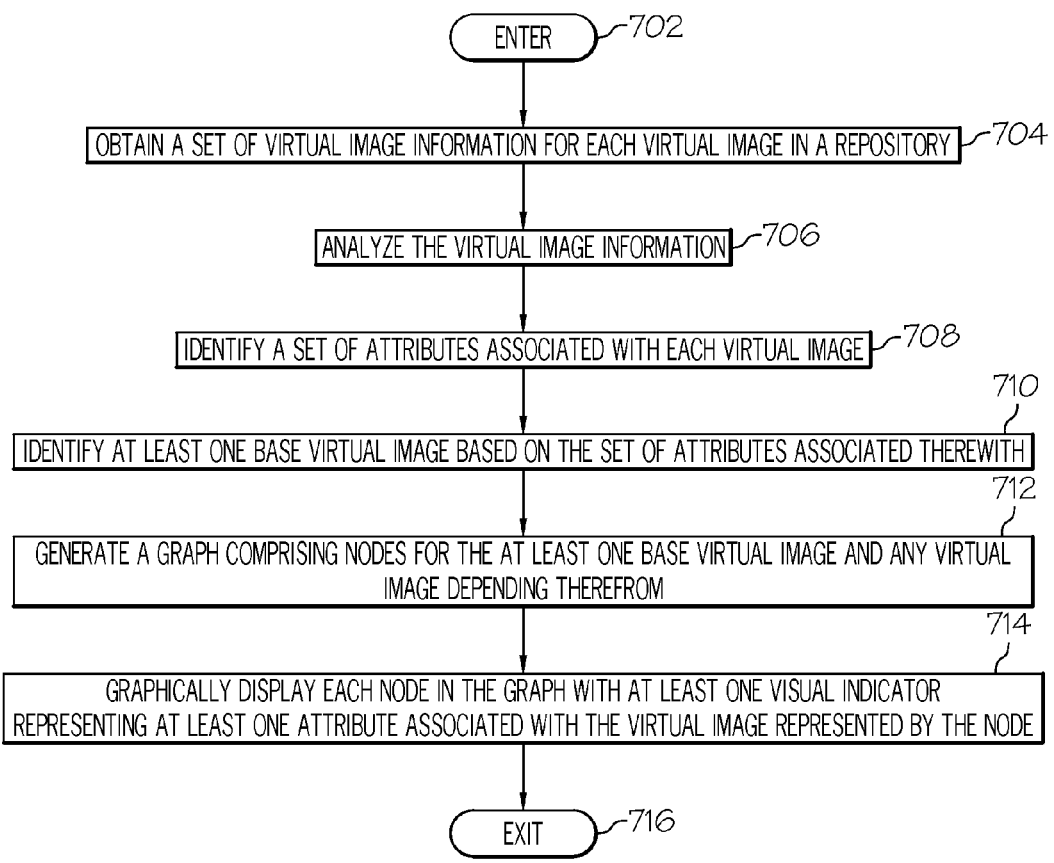
FIG. 7 is an operational flow diagram illustrating one example of a method for graphically displaying attributes associated with virtual images according to one embodiment of the present invention.

FIG. 7 shows an operational flow diagram illustrating a method for graphically displaying attributes associated with virtual images. It should be noted that the steps of the operational flow diagram shown in FIG. 7 have already been discussed above in greater detail. The operational flow diagram of FIG. 7 begins at step 702 and flows directly to step 704. The virtual image visualization manager 111, at step 704, obtains a set of virtual image information 126 for each virtual image 124 in a repository 122. The virtual image visualization manager 111, at step 706, analyzes the virtual image information 124. The virtual image visualization manager 111, at step 708, identifies a set of attributes associated with each virtual image 124 in the repository 122.

The virtual image visualization manager 111, at step 710, identifies at least one base virtual image in the repository 122 based on the set of attributes associated therewith. The virtual image visualization manager 111, at step 712, generates a graph 500 for the at least one base virtual image. The graph 500 comprises a root/center node representing the base virtual image. The graph 500 also includes nodes representing each virtual image in the repository 122 that is dependent on the base virtual image. The virtual image visualization manager 111, at step 714, graphically displays each node within the graph 500 with at least one visual indicator. This visual indicator(s) represents at least one attribute in the set of attributes associated with the virtual image represented by the node. The visual indicators have been discussed in greater detail with respect to FIG. 5. The control flow then exits at step 716.

Cloud Environment

It is understood in advance that although the following is a detailed discussion on cloud computing, implementation of the teachings recited herein are not limited to a cloud computing environment. Rather, various embodiments of the present invention are capable of being implemented in conjunction with any other type of computing environment now known or later developed. For example, various embodiments of the present invention are applicable to any computing environment with a virtualized infrastructure or an image catalog or any other type of computing environment.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto. However, it should be noted that cloud computing environments that are applicable to one or more embodiments of the present invention are not required to correspond to the following definitions and characteristics given below or in the "Draft NIST Working Definition of Cloud Computing" publication. It should also be noted that the following definitions, characteristics, and discussions of cloud computing are given as non-limiting examples.

Cloud computing is a model of service delivery for enabling convenient, on-demand network access to a shared pool of configurable computing resources (e.g. networks, network bandwidth, servers, processing, memory, storage, applications, virtual machines, and services) that can be provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as a web server and network storage, as needed, automatically, without requiring human interaction with the service's provider.

Broad network access: capabilities are available over a network and accessed through standard wired and wireless mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer does not require control or knowledge over the exact location of the provided resources but may be able to specify location at a higher level of abstraction (e.g., country, state, quality of service characteristic or datacenter).

Elasticity: capabilities can be provisioned, in some cases automatically, to scale out and released to scale in. To the consumer, the capabilities available for provisioning often appear to be unlimited and can be purchased in any quantity at any time.

Measured service: cloud systems automatically control and optimize resource use by leveraging a metering capability at various levels of abstraction appropriate to the type of service (e.g., storage, processing, bandwidth, and active user accounts). Resource usage can be monitored, controlled, and reported providing timely and accurate information for both the provider and consumer of the utilized service.

Service Models are as follows:

Software as a Service (SaaS): the capability provided to the consumer to use hosted applications running on a cloud infrastructure. The applications are accessible from various client devices through a client interface such as a web browser (e.g., web-based e-mail). The consumer may, but is not required, to manage or control the underlying cloud infrastructure including network, servers, operating systems, storage, or even individual application capabilities, with the possible exception of limited user-specific application configuration settings.

Platform as a Service (PaaS): the capability provided to the consumer to deploy onto the cloud infrastructure consumer-created or acquired applications created using programming languages and tools supported by the provider. The consumer may, but is not required, to manage or control the underlying cloud infrastructure including networks, servers, operating systems, or storage, but does control the deployed applications and possibly application hosting environment configurations.

Infrastructure as a Service (IaaS): the capability provided to the consumer to provision processing, storage, networks, and other fundamental computing resources where the consumer is able to deploy and run arbitrary software, which can include operating systems and applications. The consumer may, but is not required, to manage or control the underlying cloud infrastructure but has control over operating systems, storage, deployed applications, and possibly limited control of select networking components (e.g., host firewalls).

Deployment Models are as follows:

Private cloud: the cloud infrastructure is provided by or for a single organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or by a third party, and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., workload placement or migration for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
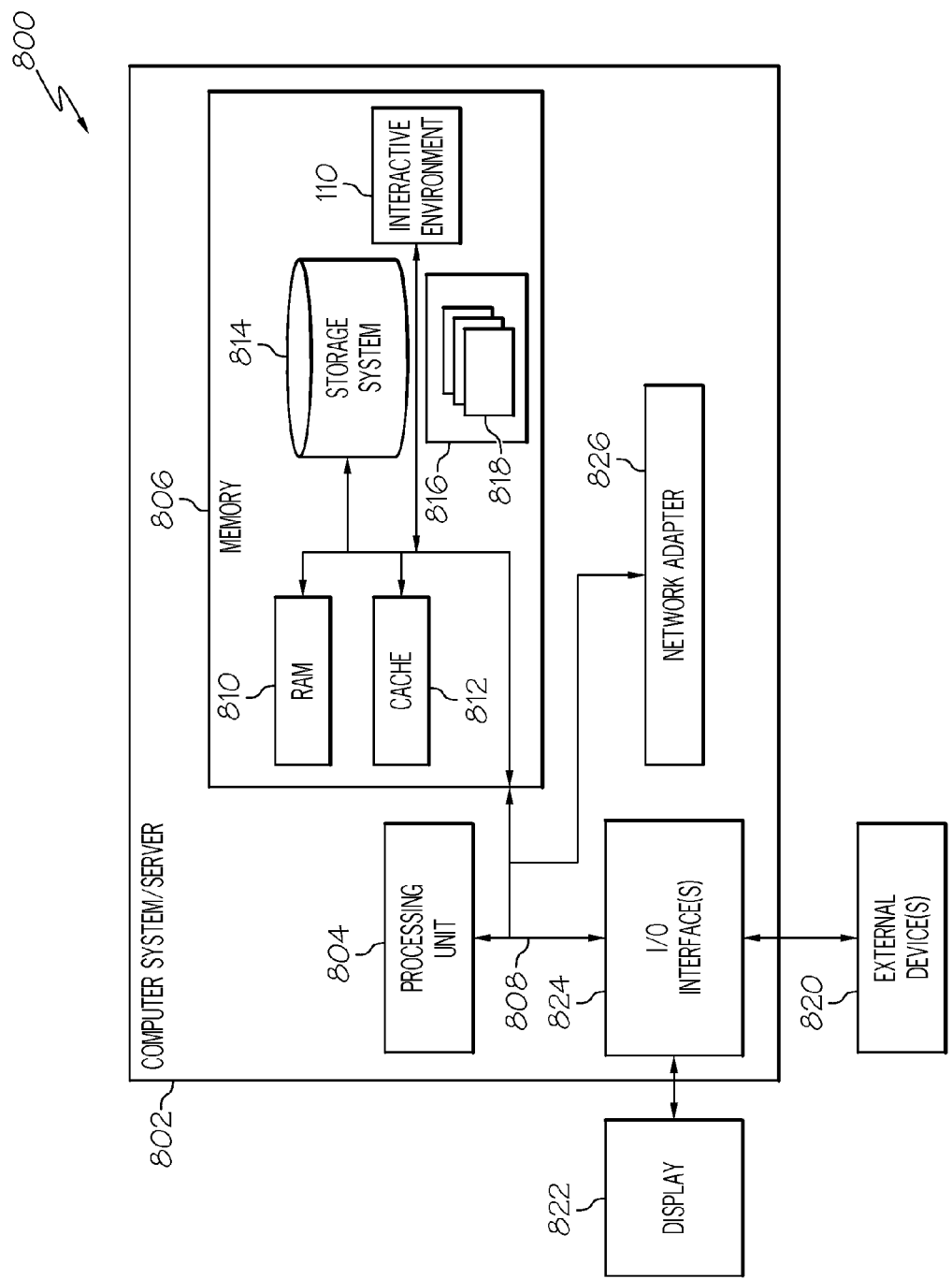
FIG. 8 illustrates one example of a cloud computing node according to one embodiment of the present invention.

Referring now to FIG. 8, a schematic of an example of a cloud computing node is shown. Cloud computing node 800 is only one example of a suitable cloud computing node and is not intended to suggest any limitation as to the scope of use or functionality of embodiments of the invention described herein. Regardless, cloud computing node 800 is capable of being implemented and/or performing any of the functionality set forth hereinabove.

In cloud computing node 800 there is a computer system/server 802, which is operational with other general purpose or special purpose computing system environments or configurations. Examples of well-known information processing systems, computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus 808 that couples various system components including system memory 806 to processor 804.

Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Universal Serial Bus (USB) and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806, in one embodiment, comprises the interactive environment 110 and its components as shown in FIG. 1. These one or more components of the interactive environment 110 can also be implemented in hardware as well. The system memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of various embodiments of the invention.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the invention as described herein.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Figure 9:
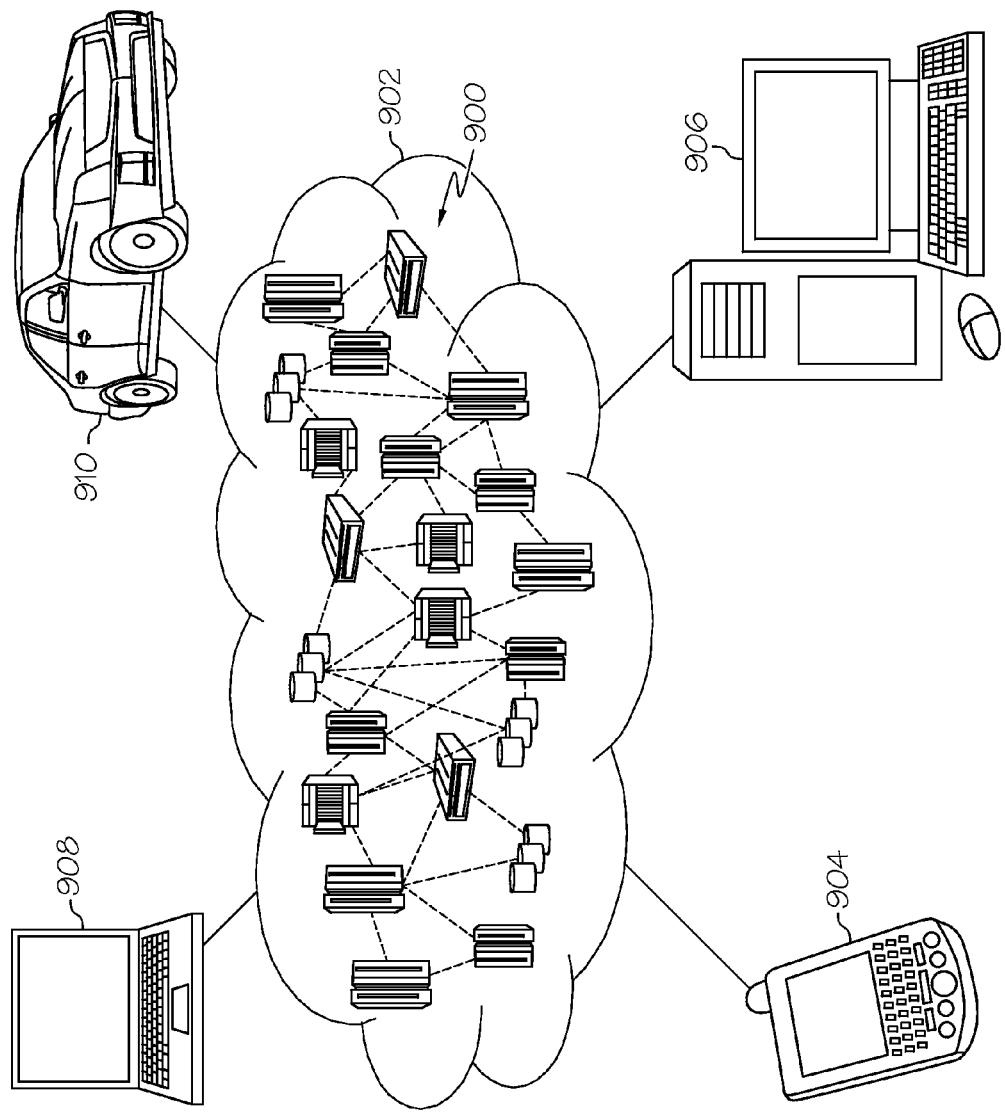
FIG. 9 illustrates one example of a cloud computing environment according to one embodiment of the present invention.

Referring now to FIG. 9, illustrative cloud computing environment 902 is depicted. As shown, cloud computing environment 902 comprises one or more cloud computing nodes 900 with which local computing devices used by cloud consumers, such as, for example, personal digital assistant (PDA) or cellular telephone 904, desktop computer 906, laptop computer 908, and/or automobile computer system 910 may communicate. Nodes 900 may communicate with one another. They may be grouped (not shown) physically or virtually, in one or more networks, such as Private, Community, Public, or Hybrid clouds as described hereinabove, or a combination thereof. This allows cloud computing environment 902 to offer infrastructure, platforms and/or software as services for which a cloud consumer does not need to maintain resources on a local computing device. It is understood that the types of computing devices 904, 906, 908, 910 shown in FIG. 9 are intended to be illustrative only and that computing nodes 900 and cloud computing environment 902 can communicate with any type of computerized device over any type of network and/or network addressable connection (e.g., using a web browser).

Figure 10:
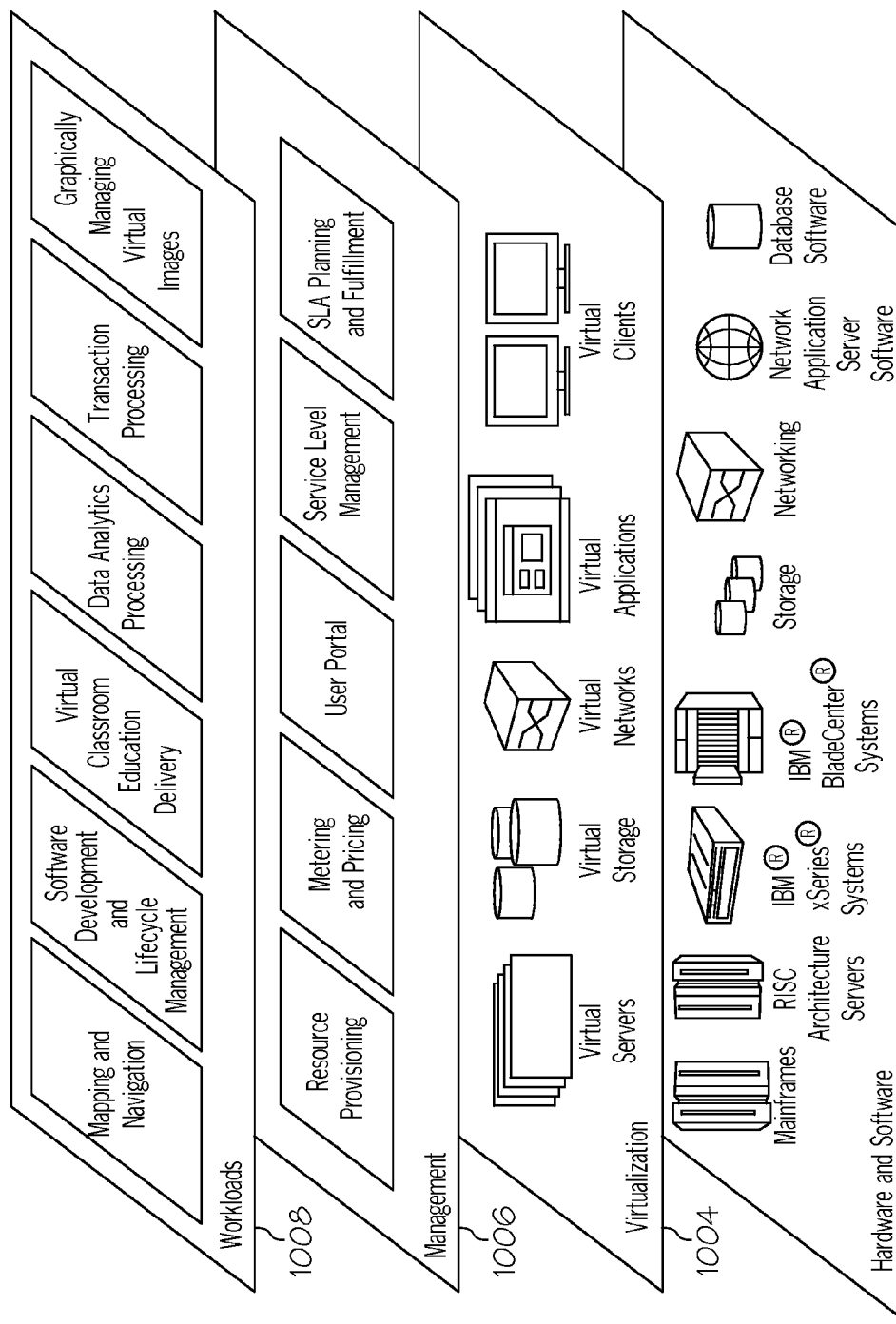
FIG. 10 illustrates examples of abstraction model layers according to one embodiment of the present invention.

Referring now to FIG. 10, a set of functional abstraction layers provided by cloud computing environment 902 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1002 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 1004 provides an abstraction layer from which the following examples of virtual entities may be provided: virtual servers; virtual storage; virtual networks, including virtual private networks; virtual applications and operating systems; and virtual clients.

In one example, management layer 1006 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1008 provides examples of functionality for which the cloud computing environment may be utilized. Examples of workloads and functions which may be provided from this layer include: mapping and navigation; software development and lifecycle management; virtual classroom education delivery; data analytics processing; transaction processing; and composable software bundle and virtual image asset design and creation.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code, data structures, etc., embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, an optical connection having one or more light guide conductors, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, functional programming languages, such as Common Lisp, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for graphically displaying attributes associated with virtual images, the information processing system comprising:

a memory;

a processor communicatively coupled to the memory; and a virtual image visualization manager communicatively coupled to the memory and the processor, the virtual image visualization manager being configured to perform a method comprising:

analyzing a set of virtual image information associated with a plurality of virtual images, wherein a virtual image in the plurality of virtual images comprises software utilized by a virtual machine that provides a virtualized computing environment;

identifying, based on the set of virtual image information, a set of attributes associated with each virtual image in a plurality of virtual images;

identifying, based on the set of attributes, at least one base virtual image and at least one set of child virtual images in the plurality of virtual images, wherein each of the child virtual images were one of directly and indirectly created from a set of content within the base virtual image;

generating, based on identifying at least one base virtual image and at least one set of child virtual images in the plurality of virtual images, at least one graph comprising a plurality of nodes, wherein each node in the plurality of nodes represents one virtual image in the plurality of virtual images, and wherein the plurality of nodes at least comprises a node representing the base virtual image and a node representing each of the set of child virtual images; and graphically displaying each node with at least one visual indicator, wherein the at least one visual indicator represents at least one attribute in the set of attributes associated with the virtual image represented by the node.

2. The system of claim 1, wherein the at least one visual indicator is at least one of:

a size of a node;

a color of a node;

a pattern of a node;

a shading of a node;

a shape of a node; and a length of a connector between nodes.

3. The system of claim 1, wherein graphically displaying each node with at least one visual indicator comprises:

determining that a first virtual image in the plurality of virtual images is dependent upon a second virtual image in the plurality of virtual images;

comparing the set of attributes associated with the first virtual image with the set of attributes associated with the second virtual image;

determining, based on the comparing, at least one of a change in resource requirements and a change in content between the first virtual image and the second virtual image; and graphically displaying at least the node representing the first virtual image with at least one visual indicator, wherein the at least one visual indicator represents the at least one of the change in resource requirements and the change in content.

4. The system of claim 1, wherein the graphically displaying each node with at least one visual indicator comprises:

analyzing the set of attributes associated with each virtual image;

identifying, based on the analyzing, a user associated with each virtual image; and graphically displaying each node with at least one visual indicator, wherein the at least one visual indicator represents the user associated with the virtual image represented by the node.

5. The system of claim 1, wherein the graphically displaying each node with at least one visual indicator comprises:
analyzing the set of attributes associated with each virtual image;
assigning, based on the analyzing, a popularity attribute to each virtual image based on the set of attributes and a popularity metric; and
graphically displaying each node with at least one visual indicator, wherein the at least one visual indicator represents the popularity attribute associated with the virtual image represented by the node.

6. A computer program product tangibly embodying computer readable non-transitory instructions which, when implemented, cause a computer to carry out the steps of a method for graphically displaying attributes associated with virtual images, the method comprising:
analyzing a set of virtual image information associated with a plurality of virtual images, wherein a virtual image in the plurality of virtual images comprises software utilized by a virtual machine that provides a virtualized computing environment;
identifying, based on the set of virtual image information, a set of attributes associated with each virtual image in a plurality of virtual images;
identifying, based on the set of attributes, at least one base virtual image and at least one set of child virtual images in the plurality of virtual images, wherein each of the child virtual images were one of directly and indirectly created from a set of content within the base virtual image the base virtual image;
generating, based on identifying at least one base virtual image and at least one set of child virtual images in the plurality of virtual images, at least one graph comprising a plurality of nodes, wherein each node in the plurality of nodes represents one virtual image in the plurality of virtual images, and wherein the plurality of nodes at least comprises a node representing the base virtual image and a node representing each of the set of child virtual images; and
graphically displaying each node with at least one visual indicator, wherein the at least one visual indicator represents at least one attribute in the set of attributes associated with the virtual image represented by the node.

7. The computer program product of claim 6, wherein the at least one visual indicator is at least one of:
a size of a node;
a color of a node;
a pattern of a node;
a shading of a node;
a shape of a node; and
a length of a connector between nodes.

8. The computer program product of claim 6, wherein graphically displaying each node with at least one visual indicator comprises:
determining that a first virtual image in the plurality of virtual images is dependent upon a second virtual image in the plurality of virtual images;
comparing the set of attributes associated with the first virtual image with the set of attributes associated with the second virtual image;
determining, based on the comparing, at least one of a change in resource requirements and a change in content between the first virtual image and the second virtual image, and
graphically displaying at least the node representing the first virtual image with at least one visual indicator, wherein the at least one visual indicator represents the at least one of the change in resource requirements and the change in content.

9. The computer program product of claim 6, wherein the graphically displaying each node with at least one visual indicator comprises:
analyzing the set of attributes associated with each virtual image;
identifying, based on the analyzing, a user associated with each virtual image; and graphically displaying each node with at least one visual indicator, wherein the at least one visual indicator represents the user associated with the virtual image represented by the node.

10. The computer program product of claim 6, wherein the graphically displaying each node with at least one visual indicator comprises:
analyzing the set of attributes associated with each virtual image;
assigning, based on the analyzing, a popularity attribute to each virtual image based on the set of attributes and a popularity metric; and
graphically displaying each node with at least one visual indicator, wherein the at least one visual indicator represents the popularity attribute associated with the virtual image represented by the node.

11. The computer program product of claim 6, wherein the method further comprises:
determining that a user is interacting with at least one node that has been graphically displayed; and
displaying to the user, in response to the determining, at least one attribute in the set of attributes associated with the virtual image represented by the at least one node interacted with by the user.

12. A tangible computer readable storage medium having stored thereon a data structure comprising information readable by an information processing system coupled to a display device to display a graph on the display device, the graph displaying attributes associated with virtual images, the graph comprising:
a root node representing a base virtual image, wherein the base virtual image is a virtual image that built independent of other virtual images, and wherein a virtual image comprises software utilized by a virtual machine that provides a virtualized computing environment; and
at least one child node coupled to at least one parent node by a connector, the root node being a parent node located at the center of the graph, wherein the at least one child node represents a virtual image that has provenance relationship associated with a virtual image represented by the at least one parent node and that was created from a set of content within the virtual image represented by the at least one parent node, the provenance relationship of the at least one child node relative to the root node being indicated by the at least one child node extending radially outward and away from the root node on the graph, and
wherein at least one of the child node and the parent node comprises at least one visual indicator representing at least one attribute associated with the virtual image represented by the at least one of the child node and the parent node.

13. The tangible computer readable storage medium of claim 12, wherein the at least one visual indicator is at least one of:
- a size of a node;
- a color of a node;
- a pattern of a node;
- a shading of a node;
- a shape of a node; and
- a length of a connector between nodes.

14. The tangible computer readable storage medium of claim 12, wherein the at least one visual indicator visually indicates at least one of a change in resource requirements and a change in content between the virtual image represented by the child node and the virtual image represented by the parent node.

15. The tangible computer readable storage medium of claim 12, wherein the at least one visual indicator visually indicates a user associated with the virtual image represented by the at least one the child node and the parent node.

16. The tangible computer readable storage medium of claim 12, wherein a length of the connector visually indicates at least one of a change in resource requirements and a change in content between the virtual image represented by the child node and the virtual image represented by the parent node.

* * * * *